United States Patent [19]

Abraham et al.

[11] Patent Number: 5,456,475
[45] Date of Patent: Oct. 10, 1995

[54] PROTECTED SEAL ASSEMBLY AND PROTECTIVE FILTER UNIT THEREFOR

[75] Inventors: Dennis J. Abraham, St. Charles; Steve A. Mims, Streamwood, both of Ill.

[73] Assignee: SKF USA Inc., Elgin, Ill.

[21] Appl. No.: 188,493

[22] Filed: Apr. 28, 1988

[51] Int. Cl.$^6$ ............ B01D 35/00; B01D 34/50; F16J 15/32; F16J 15/54
[52] U.S. Cl. ............ 277/23; 210/171; 210/497.2; 210/499; 277/24; 277/35; 277/37; 277/44; 277/45; 277/153; 277/237 A; 384/473
[58] Field of Search ............ 277/23, 237 A, 277/DIG. 4, 153, 51, 24, 37, 152, 35, 44, 45; 384/477, 473; 210/499, 171, 497.01, 497.2

[56] References Cited

U.S. PATENT DOCUMENTS

| | | | |
|---|---|---|---|
| 2,237,616 | 4/1941 | Smith | 384/477 |
| 2,833,577 | 5/1958 | Reynolds | 277/24 |
| 2,907,594 | 10/1959 | Macks | 277/23 |
| 2,919,148 | 12/1959 | Smith | 277/23 X |
| 3,345,076 | 10/1967 | Wheelock | 277/24 |
| 3,347,553 | 10/1967 | Schweiger | 277/74 X |
| 3,424,273 | 1/1969 | Carlson | 384/473 X |
| 3,495,843 | 2/1970 | Andersen et al. | 277/188 R X |
| 4,243,232 | 1/1981 | Repella | 277/37 |
| 4,300,778 | 11/1981 | Gagne | 277/153 |
| 4,359,228 | 11/1982 | Cather | 277/DIG. 4 |
| 4,493,490 | 1/1985 | Ohma | 277/152 X |
| 4,674,755 | 6/1987 | Colanzi et al. | 277/23 |
| 4,844,255 | 7/1989 | Schmitt | 277/23 |
| 4,943,068 | 7/1990 | Hatch et al. | 277/23 |

Primary Examiner—Daniel G. DePumpo
Attorney, Agent, or Firm—Lockwood Alex FitzGibbon & Cummings

[57] ABSTRACT

A protective filter unit for use with a fluid seal assembly. The filter unit includes a screen positioning unit and a filter screen extending inwardly of portions of the positioning unit and terminating in an inner screen edge spaced just apart by a working clearance from a shaft forming a part of the sealed mechanism. The filter is associated in use with a seal having a seal casing which may be aligned with the screen positioning unit of the filter, and an elastomeric seal body having portions defining a seal band which engages the sealed shaft and another portion bonded to the seal casing. Preferably the screen positioning unit includes inner and outer support rings held apart by spacers, and the support rings, the spacers, and the screen are all made from plastic materials.

7 Claims, 2 Drawing Sheets

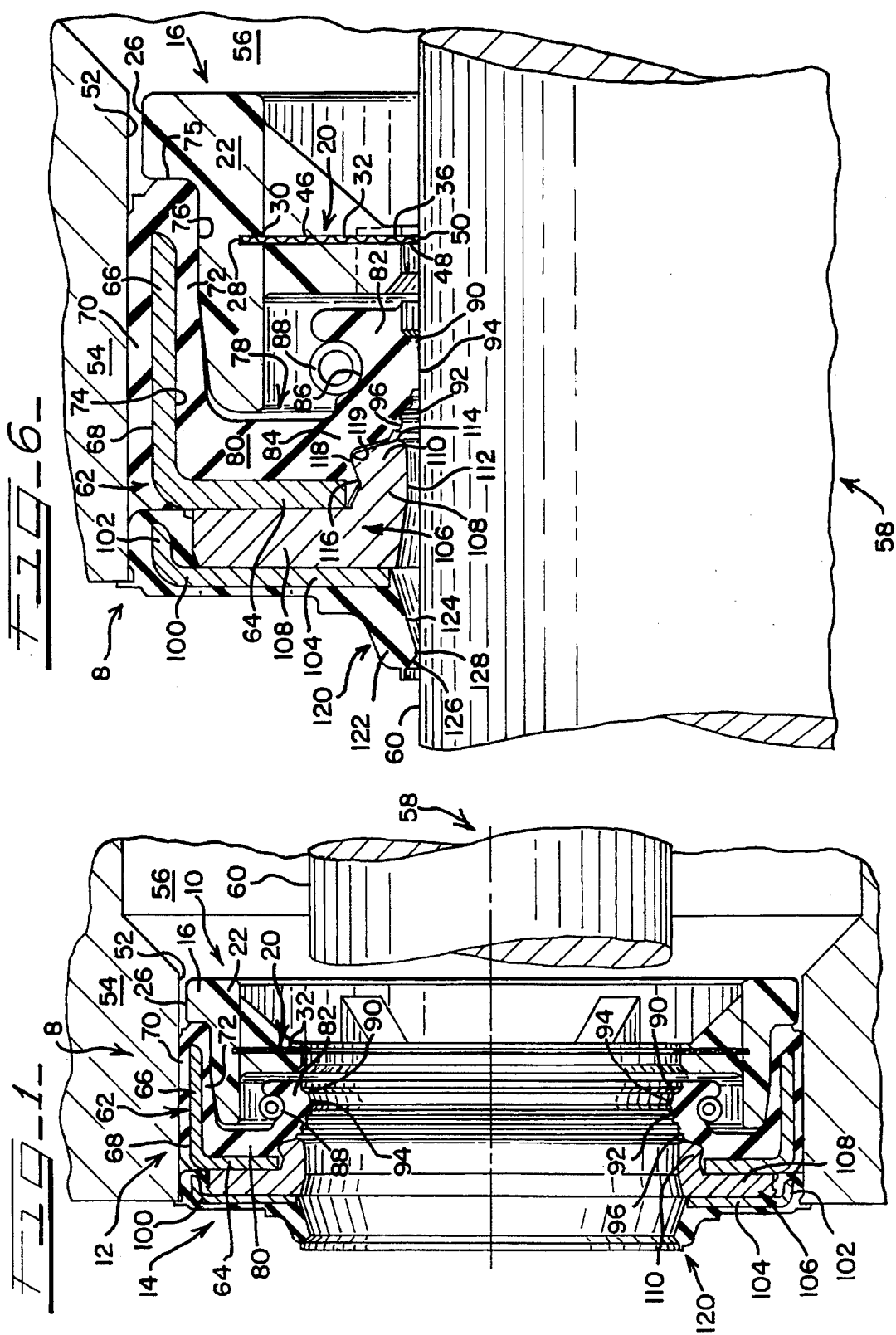

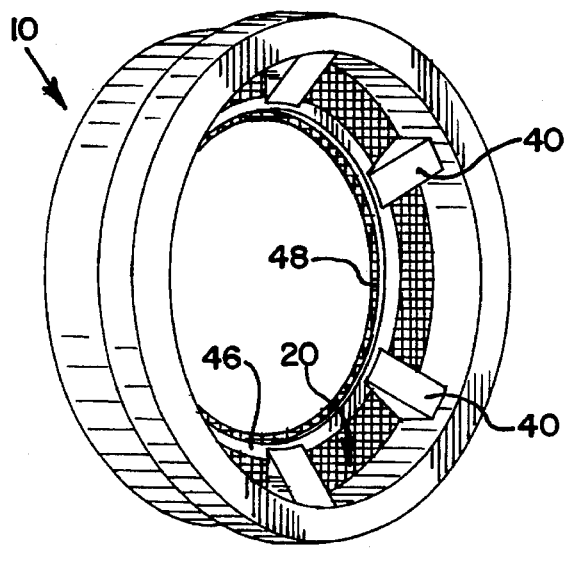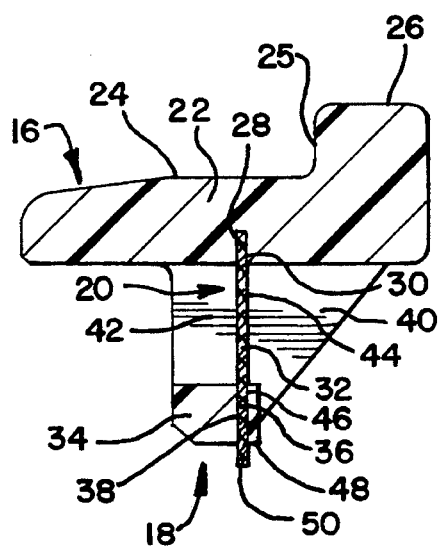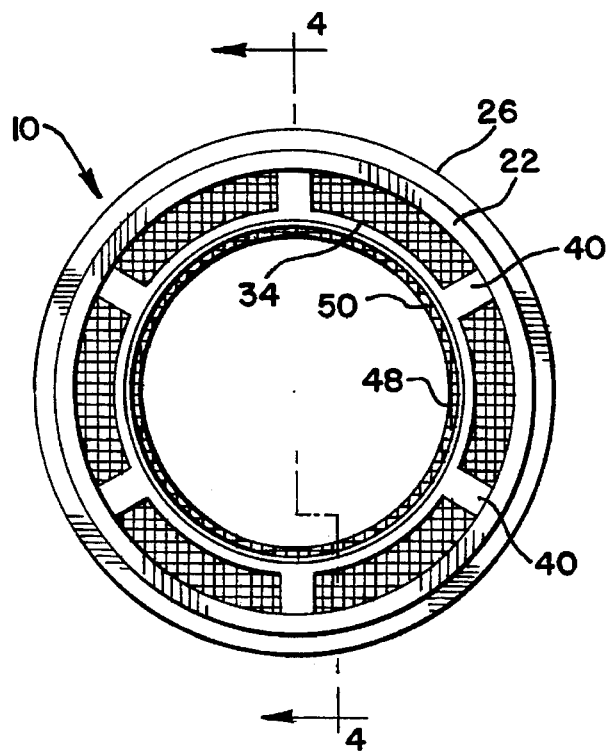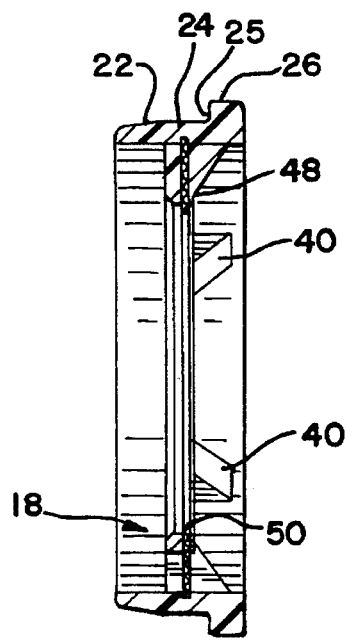

PROTECTED SEAL ASSEMBLY AND PROTECTIVE FILTER UNIT THEREFOR

BACKGROUND OF THE INVENTION

The present invention relates generally to fluid seal assemblies, and more particularly, to the combination of fluid seal units with specialized protective filter units, whereby a seal assembly may be provided which will operate in a trouble-free manner in use. The invention relates, in one aspect, to a specialized protective filter unit which is adapted for use with a fluid seal, as well as to the combination of the protective filter unit with the associated seal unit to form a novel assembly. The invention provides a seal of increased reliability, particularly in specialized seal and mechanisms where high internal pressure and the possibility of particulate contaminants are present.

Modern fluid seals are extremely versatile in use, and are capable of sealing oil, for example, under varying conditions of pressure and temperature, without leakage, over a life span of millions of machine cycles. A typical oil seal used in a hydraulic circuit application now generally comprises a stiff exterior casing element, such as a metal stamping or the like which has an elastomeric seal lip body bonded thereto. The casing may be partially or entirely surrounded with the elastomeric material for the purpose of locating and mounting the seal within an associated machine part, i.e., in a housing counterbore.

The lip portion of the elastomeric seal body rides over a rotary or reciprocating shaft or other part in use. In particular, in a number of hydraulic mechanisms, including automotive power steering units, oil or like hydraulic fluid may be maintained within a sealed cavity under extreme pressures, which may range up to 500 to 1,000 psi or more. The seal which retains oil in a cavity forming the interior of such mechanism, usually includes a primary lip, and often also includes one or more auxiliary or excluder lips formed as a part of the primary seal lip, or formed separately and used with another component which is associated with the seal unit in use.

Power steering mechanisms, particularly the rack and pinion type, include a reciprocable shaft or rack having end portions which move into and out of the sealed region, assisted by strong forces which are in turn generated in the hydraulic fluid which the seal is called upon to confine. Existing seal designs are fully capable of retaining such fluid within the sealed region, even under these high pressure conditions, for an extremely high number of cycles, as long as a proper sealing environment is maintained.

Such performance, however, depends on the presence of proper working conditions. For seals to perform in this manner, the sealed part which reciprocates relative to the seal must have a surface finish falling within closely defined limits, and the design of the mechanism must permit a generous supply of fluid to be present at the seal-shaft interface. In many cases, an otherwise satisfactory seal will leak or a sealed part may be seriously scored or otherwise damaged if contaminants present in the fluid to be sealed reach this interface. Thus, in a typical automotive power steering application, if metal chips or other remnants from the machining process find their way into the hydraulic fluid, these particles may lodge between the seal lip and the sealed part. With the passage of time and continual reciprocation of the sealed part, a score or groove may develop in the part to a degree sufficient to cause seal leakage; in some cases the damage is such that not only the seal but also the shaft or other element must also be replaced.

Needless to say, the expense of replacing sealed parts forming portions of a hydraulic mechanism can be considerable, especially where the high cost of skilled labor and the inconvenience of gaining access to the sealed part are considered. Still further, the end user of a product of this sort may perceive an oil leak and/or the requirement for replacing part of an important mechanism to be a reflection of low vehicle quality, with extremely adverse consequences for the manufacturers and marketers of the vehicles in question. The same considerations also apply in respect to those suppliers who furnish components or subassemblies to manufacturers and/or assemblers of vehicles.

Consequently, there has been a need for a seal system which will, where possible, insure that failure to provide exceptionally clean individual machine elements will not result in a subsequent seal failure with a concomitant large expense, loss of reputation for quality and in some cases, total failure of expensive, sealed machine parts.

In the manufacture of hydraulic assemblies, including power steering units, it is well known that complex machining operations including boring, honing, counterboring, drilling, tapping, end facing and other finishing steps are required. These operations are usually performed in sequence on highly complex, automated machinery. When the machining and finishing cycles are completed, the part is intended to be cleaned so that no chips or other residue from the machining operation remain in the finished part. However, as in other highly automated and engineered products, there is always a potential for an isolated failure, and as a result there has been a need for a product such as that provided by the present invention, which will further forestall the possibility of such failure, and preferrably do so with high reliability at low cost. Of course, contaminants may also find their way into seal ed mechanisms by other means, such as when fluid is changed or added to the mechanism.

According to the invention, a seal system with a protective filter unit is provided, which protective filter unit is used in tandem with an existing high pressure seal, with the filter being positioned so that it will entrap whatever filings or scrap may be present in the fluid and either retain them on the face of the seal or confine them to an area wherein they are not wedged by a strong hydraulic action between the seal lip and the reciprocable part. In this connection, it will be appreciated that modern hydraulic seals are designed in such a way that, as the pressure in the sealed cavity rises, this pressure is exerted around the outer periphery of the elastomeric seal lip body, and this in turn applies an increased radial compressive sealing load through the elastomer to the surface of the sealed part. In other words, as hydraulic pressures tending to cause leakage rises, the sealing force generated at the sealing lip-machine element interface rises correspondingly to offset this tendency or potential to leak.

According to the present invention, a unique filter element is provided which is capable of separate manufacture and insertion and use in tandem with an existing seal to form a novel seal system and sealed mechanism; of course, the seal could be manufactured with the filter as an integral part thereof.

In view of the failure of prior art seals to provide the contaminant reduction and/or control action presently required of hydraulic mechanisms, including power steering units, it is an object of the present invention to provide an improved protective filter unit for use with a seal forming a part of a sealed hydraulic mechanism.

Another object of the invention is to provide a combination novel protective filter unit and fluid seal assembly capable of preassembly as a unit before being inserted in a portion of the sealed mechanism.

A further object is to provide a seal assembly which includes an integral filter unit adapted to protect the so-called oil side of the seal from contamination by fluid-borne grit particles or other contaminants.

Another object of the invention is to provide a protective filter unit for an oil seal, which filter unit is made from readily available materials by existing technology and which may therefore be mass produced at low cost. A still further object of the invention is to provide a protective filter unit for a seal assembly which includes a ring or casing adapted for registration and interfitting with an associated seal unit and which includes, in addition to the ring or casing, a radially inwardly extending protective filter screen affixed to the ring or casing.

Another object of the invention is to provide a protective filter unit for a seal assembly which utilizes a filter screen made from a fine mesh plastic material.

Yet another object of the invention is to provide a protective filter unit for a fluid seal, which filter unit includes an outer support ring adapted for cooperation with the casing of an associated seal unit, and an annular, inner filter element support ring spaced apart from the outer support ring by a plurality of spacer units, and a filter screen extending between and joined to the support rings, with the filter screen having an inner margin terminating in an edge portion which defines a circular opening for passage of a machine element, with the inner edge being spaced apart by not more than a working clearance from the machine element to protect the inside of the filter unit and the associated seal from contamination by particles in the sealed fluid.

It is also an object of the invention to provide a seal assembly which includes a protective filter unit, and a high pressure seal assembly which includes a casing and an elastomeric seal body, with the casing and a portion of the seal body cooperating to form a mounting surface for the filter unit, and wherein the filter unit includes an exterior casing unit with portions of the filter unit and the seal casing being mutually engageable with each other whereby the filter may be axially and radially located with respect to the seal.

A still further object of the invention is to provide a multipart seal assembly which includes a filter element, a seal element registerable with the filter unit, and an auxiliary element which includes an anti-extrusion or backup support unit for the elastomeric primary seal lip body of the seal element, with or without an auxiliary or excluder lip having portions adapted to engage the exterior surface of the sealed part which lies outside the sealed region.

A still further object of the invention is to provide a sealed mechanism which includes a housing, a machine element having a part reciprocable into and out of the housing and a composite seal assembly for the housing and the reciprocable part, with the seal assembly including a primary seal unit having a casing and an elastomeric seal lip portion, a protective filter unit disposed axially inwardly of the primary seal unit and including a filter element support ring and a filter screen unit, with the seal assembly further including an auxiliary or an excluder lip, with or without a backup or pressure absorbing element for portions of the body of the primary seal lip.

The foregoing and other objects and advantages of the invention are achieved in practice by providing a protective filter unit for use with a seal assembly wherein the protective filter unit includes an annular outer support ring adapted to be positioned axially inwardly of an associated fluid seal unit, a filter element extending radially inwardly of said outer support unit, with the filter element being retained in position relative to said support ring such that the inner portion of the filter screen is spaced apart from an associated reciprocable machine element by not more than a working clearance. The invention also achieves its object by providing such a filter unit, either in combination with or forming a part of an associated seal assembly which may in turn optionally include an auxiliary seal assembly with an excluder lip and an elastomeric seal body support element.

The exact manner in which the foregoing and other objects and advantages of the invention are achieved in practice will become more clearly apparent when reference is made to the following detailed description of the preferred embodiments of the invention set forth by way of example, and shown in the accompanying drawings, wherein like reference numbers indicate corresponding parts throughout.

BRIEF DESCRIPTION OF THE DRAWINGS

FIG. 1 is a fragmentary vertical sectional view of certain portions of the sealed mechanism incorporating the filter unit and seal of the invention, and showing constructional details of the novel filter unit combined with an associated seal assembly;

FIG. 2 is a perspective view of the protective filter unit of the invention, shown separately from the remainder of the seal assembly;

FIG. 3 is an end elevational view of the protective filter unit of FIG. 2;

FIG. 4 is a vertical sectional view of the protective filter unit of FIGS. 2 and 3, taken along lines 4—4 of FIG. 3;

FIG. 5 is a fragmentary enlarged vertical sectional view of a portion of the protective filter unit of FIGS. 2–4; and FIG. 6 is an enlarged fragmentary vertical sectional view of the seal and filter assembly of FIG. 1, showing the same in relation to an associated sealed part.

DESCRIPTION OF THE PREFERRED
EMBODIMENTS OF THE INVENTION

While the protective filter unit of the invention and the combination filter unit and seal assembly may be used in a number of applications, and may vary somewhat in construction, a description of the invention will be given wherein the mechanism to be sealed is an automotive power steering unit, wherein one element of the mechanism is a stationary housing and the other element is a reciprocable rack or shaft, wherein the seal unit is a two-element assembly comprising a principal seal unit and an auxiliary seal unit, and wherein the protective filter unit is a separate unit made from plastic materials and positioned axially inwardly of the other elements of the seal assembly.

Referring now to the drawings in greater detail, FIG. 1 shows that the invention comprises a protected seal assembly generally designated 8 which is shown to include a plurality of individual elements including a protective filter unit generally designated 10, a primary or principal fluid seal unit generally designated 12 and an auxiliary or excluder seal unit generally designated 14.

According to the invention, the protective filter unit 10 includes screen positioning means in the form of an outer support and positioning ring generally designated 16 (FIGS. 1, 5 and 6), a radially inner screen support and positioning ring generally designated 18, and a filter screen unit generally designated 20. The outer support ring 16 is shown to include a principal body portion 22 having a radially outwardly directed mounting surface 24 for alignment and engagement with a cooperating inwardly directed surface forming a part of the principal seal unit 12, which is shown and described in detail elsewhere herein.

The outer support ring 16 also includes a radially outwardly directed enlarged, diameter outer surface 26 connected to the positioning surface 24 by a radially extending shoulder surface 25. In addition, the support ring 16 includes a radial groove 28 which snugly receives and positions the outer margin 30 of the screen unit 20. The screen 20 includes a principal, unsupported body portion 32, and has its radially inner margin 36 affixed to the axially inwardly facing surface 38 of the inner support ring body 34. As is also shown in FIGS. 2–5, there are a plurality of radially inwardly extending ring spacer units 40 extending between the support rings 16, 18. These spacer units 40 include generally flat seal side surfaces 42 and generally inclined cavity side surfaces 44. The principal portion 32 of the filter screen body 20 is bonded to these spaced apart seal side surfaces 42.

In the preferred form, there may be a region 46 wherein the material forming the spacer units 40 is diffused into the adjacent portions of the screen to provide a secure mechanical fastening action. As is shown in FIGS. 2 and 3, and particularly in FIG. 5, the screen 20 includes an innermost margin 48 which lies radially inwardly of the body 34 of the inner support ring 18, with such margin 48 terminating in a radially innermost edge portion 50. This edge, as is best shown in FIG. 6, is intended to be spaced apart by a working clearance only from an adjacent oppositely directed surface portion of the mechanism.

Referring now to the other elements of the protected seal assembly 8, FIGS. 1 and 6 show that the primary fluid seal unit 12 and the excluder seal unit 14 are both positioned on a radially inwardly facing, circumferentially extending counterbore surface 52 forming a part of a housing 54 whose surfaces also define an interior or sealed region portion 56. As is also shown in FIGS. 1 and 6, a rotary or reciprocably movable shaft generally designated 58 extends outwardly from the sealed region 56 and presents a radially outwardly directed circumferentially extending surface 60, of which at least portions are machined to a specified surface finish. This surface 60 is the surface which is spaced apart from the radially inner edge 50 of the screen 20 by no more than a working clearance, to insure that particulate matter does not pass between the inner filter edge 50 and the surface 60 of the shaft 58.

Referring now to the details of the primary sealing unit 12, this unit is shown to include a casing unit generally designated 62 having radially and axially extending flanges 64, 66. As shown, the outer surface 68 of the axial or mounting flange 66 is covered with a cylindrical body 70 of an elastomeric material; the seal unit 12 is therefore often referred to as a so-called "rubber OD" seal unit. The primary seal assembly 12 also includes a circumferentially extending inner body 72 of elastomeric material bonded to the radially inwardly directed circumferential surface 74 of the casing axial flange 66. The innermost surface 76 of this elastomeric filter mounting body 72 lies in opposed facing relation to the outwardly directed surface 24 of the support ring 16.

In addition to the elastomeric elements just described, the primary seal unit 12 includes an elastomeric seal body generally designated 78 and shown to be subdivided into a bonding portion 80, a seal body portion 82 and a flex section 84. The seal body 82 includes an annular groove 86 for receiving and positioning a garter spring 88.

In addition, the seal body 82 includes oil and air side surfaces 90, 92, meeting along a generally circular locus to form a primary seal band 94, which engages the surface 60 of the shaft 58 in fluid tight relation. One or more auxiliary ribs 96 may be provided on the air side of the seal body 82, for lubricant retention and reduced wear. This concept, although not a necessary feature of the invention, may be advantageous in some applications and is described and claimed in U.S. Pat. No. 4,560,177, issued Dec. 24, 1985, to the assignee of the present applicant.

Because one primary use of the seal assembly of the invention is in high pressure applications, the auxiliary seal unit 14 is preferably used in tandem with both the filter unit 10 and the primary seal unit 12. This auxiliary seal unit 14 is shown to include a seal casing 100 having an axially extending mounting flange 102, a radial flange 104, and a backup ring generally designated 106 lying axially inwardly of the flange 104.

The backup ring 106 is shown to include a radially extending annular body 108, an axially extending annular collar 110 which is defined in part by an inwardly directed circumferential surface 112. In addition, a pair of frustoconical or tapered surfaces 114, 116 on the collar 110 meet to define a land 118 which is receivable within a groove 119 (FIG. 6) in the flex section 84 of the seal lip body 80.

In addition to the foregoing elements, the auxiliary seal assembly 14 includes an excluder lip unit generally designated 120 and shown to include a body portion 122 which is bonded to the radial flange 104 of the auxiliary seal casing 100. An excluder seal band 128 of generally circular form is defined by convergent frustoconical, axially inner and outer surfaces 124, 126.

By axially "inner" is meant toward the sealed region or "oil" side of the assembly as a whole. As is known in the seal art, the excluder lip is intended to maintain the area axially inwardly thereof free of dust and grit particles but does not itself provide a pressure seal function. This lip may run in a "dry" condition or may be lubricated by whatever incidental oil remains on the shaft as it passes in and out of the sealed region 56.

In the preferred form, the backup ring 106 is made from a structurally rigid plastic material such as a filled or unfilled nylon. The excluder lip body and the primary seal lip bodies are made from suitable elastomers, such as nitrile or fluoroelastomer compounds, for example. In the preferred form of seal, all of the components of the filter unit 10 are made from synthetic plastic materials, with the outer and inner support rings 16, 18, the spacer units 40 being made from the same plastic material. In the preferred form, these units are made in an insert molding process wherein margins of the screen body 20, which is also made from a fine mesh plastic material, are bonded directly to the rings and spacers as the filter assembly is formed in one piece.

Referring now to the manufacture and assembly of the seal of the invention, after the filter unit has been manufactured by insert molding, using injection molding, compression molding, or transfer molding techniques of a type known to those skilled in the art, the filter unit is inserted from the axially open or inner end of the elastomeric seal with the filter unit being received in position by a snug press fit occasioned by interference between the opposed surfaces 24, 76. The radial shoulder surface 25 on the filter unit may engage an end face surface 75 of the elastomer body 72 forming a part of the primary seal unit 12. This insures proper axial positioning of the parts 10, 12. When the mechanism is ready for sealing, these elements 10, 12, 14 may be inserted as a unit, with the inner edge 50 of the screen 20 passing over the part and the seal being positioned in the counterbore 52 in a known manner. During this operation or thereafter, the auxiliary unit 14 may be inserted into the position shown in FIGS. 1 and 6. In this condition, the groove 119 receives the annular land 118 with a snap-in action so that the two seal units 12, 14 are kept together and function as a unit.

In the use of the seal, when there is a significant increase in pressure within the sealed cavity 56, whatever hydraulic forces are present apply a radial compressive load to the elastomeric seal body 82, urging it into an increasingly tight fitting relation with the surface 60 of the shaft 58. The undue deformation of the seal is prevented by engagement and support between the surfaces 114, 116 of the seal support or backup ring 106. This overcomes any tendency for the seal to be extruded out of the seal cavity along the surface of the shaft; this backup action is not novel per se and is known and understood by those skilled in the sealing art.

In use, the protection provided by the filter prevents particles from moving into the critical mutual contact area between the inner surfaces 90, 92, 94 of the elastomeric seal and the outer surface 60 of the sealed part 58. In this way, chips, shavings, or the like may not be embedded in the surface of the elastomer and forced against the shaft to cut or score it so as to cause a tendency to leakage.

The screen permits passage of oil therethrough whereby the seal lip may be lubricated properly and yet contaminants cannot pass into this area. The screen is sufficiently porous so that, after initial filling and pressurization, there is no significant pressure drop or flow developed across the screen, there being approximately equal fluid pressure on both sides of the screen.

It will thus be seen that the present invention provides a novel protected seal assembly and protective filter unit therefor having a number of advantages and characteristics including those pointed out above and others which are inherent in the invention. Preferred embodiments of the invention having been described by way of example, it will occur to those skilled in the art that variations in the exact form of seal and the materials used therein may be made without departing from the spirit of the invention or the scope of the appended claims.

We claim:

1. A protective filter unit adapted for use with a fluid seal unit disposed in a fluid receiving cavity having an opening therein closed off by said seal unit and an associated sealed part defined by a relatively movable machine element, said protective filter unit being adapted to be associated in use and positioned closely adjacent said fluid seal unit, said protective filter unit comprising, in combination, generally annular inner and outer filter element support and positioning rings, a plurality of support and positioning ring spacer units circumferentially apart from one another and extending radially between said inner and outer filter element support and positioning rings, a filter element extending radially at least between said inner and outer rings, said outer support and positioning ring having a portion adapted for alignment and engagement in registration with said associated fluid seal unit, with an inner margin portion of said filter element being adapted in use to be spaced apart by only a working clearance from a relatively movable sealed machine element, said filter element including a body having portions mechanically secured at least to said inner and outer support and positioning rings so as to prevent passage of fluid contaminants between said element and said inner and outer rings, said filter unit being thereby adapted to prevent buildup of contaminant particles between respective opposing surfaces of said seal unit and said machine element while permitting fluid to pass through said filter element so as to contact and lubricate said respective surfaces of said machine element and said seal unit.

2. A protective filter unit as defined in claim 1 wherein said filter element is in the form of a plastic screen unit.

3. A protective filter unit as defined in claim 1 wherein said filter element also includes portions mechanically secured to said support and positioning ring spacer units.

4. A protective filter unit as defined in claim 1 wherein said filter element is in the form of a screen unit, having radially outer and inner edges, with said inner screen edge extending radially inwardly beyond the radially innermost portion of said inner support and positioning ring.

5. A protective filter unit as defined in claim 1 wherein said portion of said outer support and positioning ring adapted for alignment and engagement in registration with portions of said associated seal assembly include radially outwardly directed surfaces sized for cooperative engagement with radially inwardly directed surface portions of said associated seal assembly.

6. A protective filter unit as defined in claim 1 wherein said filter element is in the form of a plastic screen and wherein said inner and outer support and positioning rings and said spacer elements are all made from synthetic plastic materials.

7. A protective filter unit as defined in claim 6 in which said rings and said spacers are made from the same plastic material.

* * * * *